United States Patent
Watanabe et al.

(10) Patent No.: US 6,766,237 B2
(45) Date of Patent: Jul. 20, 2004

(54) SHIFT CONTROL SYSTEM FOR CONTINUOUSLY VARIABLE TRANSMISSION

(75) Inventors: Masaki Watanabe, Tokyo (JP);
Yasutaka Kawamura, Kanagawa (JP);
Hiroyasu Tanaka, Kanagawa (JP);
Masaoki Horio, Shizuoka (JP)

(73) Assignee: JATCO LTD, Fuji (JP)

( * ) Notice: Subject to any disclaimer, the term of this patent is extended or adjusted under 35 U.S.C. 154(b) by 10 days.

(21) Appl. No.: 10/327,661

(22) Filed: Dec. 24, 2002

(65) Prior Publication Data

US 2003/0135315 A1 Jul. 17, 2003

(30) Foreign Application Priority Data

Dec. 28, 2001 (JP) .......................... 2001-399341

(51) Int. Cl.[7] .............................................. B60K 41/04
(52) U.S. Cl. ........................ 701/51; 701/93; 701/95; 701/96; 477/37
(58) Field of Search ............................. 701/51, 93, 95, 701/96; 477/37; 180/179

(56) References Cited

U.S. PATENT DOCUMENTS 6,466,851 B2 * 10/2002 Kato et al. .................. 701/51
6,671,607 B2 * 12/2003 Ishizu et al. ................. 701/93
2003/0135316 A1   7/2003 Kawamura et al.

FOREIGN PATENT DOCUMENTS

JP         5-26317 A       2/1993
JP      2001-132827 A      5/2001

* cited by examiner

*Primary Examiner*—Marthe Y. Marc-Coleman
(74) *Attorney, Agent, or Firm*—Foley & Lardner LLP

(57) ABSTRACT

A shift control system for a toroidal CVT employs a shift technique for setting a torque shift compensation quantity so as to be increased as an actual gear ratio approaches a low-speed side gear ratio region including a lowest-speed gear ratio and so as to be decreased when the actual gear ratio is in the low-speed side gear ratio region. Further, the shift control system is arranged to select a gear ratio in a low-speed side gear ratio region after a gear ratio in a high-speed side gear ratio region is selected.

14 Claims, 8 Drawing Sheets

SHIFT CONTROL SYSTEM FOR CONTINUOUSLY VARIABLE TRANSMISSION

BACKGROUND OF THE INVENTION

The present invention relates to a shift control system for a toroidal continuously variable transmission (toroidal CVT), which system enables a vehicle to smoothly start running at a lowest-speed gear ratio.

Japanese Patent Provisional Publication No. 5-26317 discloses a cam structure which is arranged to increase an inclination angle of an operation surface of a precession cam in a toroidal CVT so that a feedback gain of a mechanical feedback system is increased in a gear ratio region close to the lowest-speed gear ratio. In case that the feedback gain of the mechanical feedback system is increased in a gear ratio region close to the lowest-speed gear ratio, a shift speed during shifting is suppressed as the actual gear ratio approaches the lowest-speed gear ratio. This arrangement prevents a power roller supporting member of the toroidal CVT from being excessively tilted over a position corresponding to the lowest-speed gear ratio, and therefore this arrangement prevents a collision between the power roller supporting member and a tilt stopper.

Japanese Patent Provisional Publication No. 2001-132827 discloses a control technique for adjusting an actual gear ratio at a desired gear ratio upon taking account of a generation of a torque shift caused after a shifting of a toroidal CVT. More specifically, this control technique is arranged to obtain a command gear ratio by adding the desired gear ratio and a torque shift compensation quantity TSrto, which takes a maximum value when a gear ratio Ratio0 takes a lowest-speed gear ratio $\alpha 1$ as shown in FIG. 10 wherein a transmission input torque is constant, and to control a shift control device according to the command gear ratio so as to correspond the actual gear ratio to the desired gear ratio.

Since the torque shift compensation quantity TSrto is adapted to correct an attainable gear ratio toward a high-speed side gear ratio (corresponding to decreasing the attainable gear ratio), it takes a negative value as shown in FIG. 10. When an absolute value of the torque shift compensation quantity is high, it is called and defined that the torque shift compensation quantity is large throughout the specification.

SUMMARY OF THE INVENTION

However, if both of the above discussed techniques are employed to improve a shift control system of a toroidal CVT, that is, when the feedback gain of the mechanical feedback system is set a large value to prevent the collision between the power roller supporting member and the tilt stopper as disclosed in the former technique and when the torque shift compensation quantity in a gear ratio region close to the lowest-speed gear ratio $\alpha 1$ is set to take a large value as shown in FIG. 10 discussed in the latter technique, a shifting to the lowest-speed gear ratio is incompletely executed due to the excessive suppression by both techniques, without achieving the lowest-speed gear ratio. Accordingly, this simple combination of the former and latter techniques degrades a starting performance for staring the vehicle from a stop state.

It is therefore an object of the present invention to provide an improved shift control system for a toroidal CVT which system employs a shift tactics for solving the above-discussed operational problem.

An aspect of the present invention resides in a shift control system for a toroidal continuously variable transmission (toroidal CVT) of a vehicle. The shift control system comprises a controller which is configured to calculate a command gear ratio of the toroidal CVT by adding a desired gear ratio and a torque shift compensation for compensating a difference between the desired gear ratio and an actual gear ratio which difference is generated by a shifting operation of the toroidal CVT, to set the torque shift compensation quantity so as to increase as the actual gear ratio approaches a low-speed side gear ratio region including a lowest-speed gear ratio and so as to decrease when the actual gear ratio is in the low-speed side gear ratio region.

The other objects and features of this invention will become understood from the following description with reference to the accompanying drawings.

DETAILED DESCRIPTION OF THE INVENTION

Hereafter, an embodiment of this invention is explained in detail with reference to the drawings.

Figure 1:
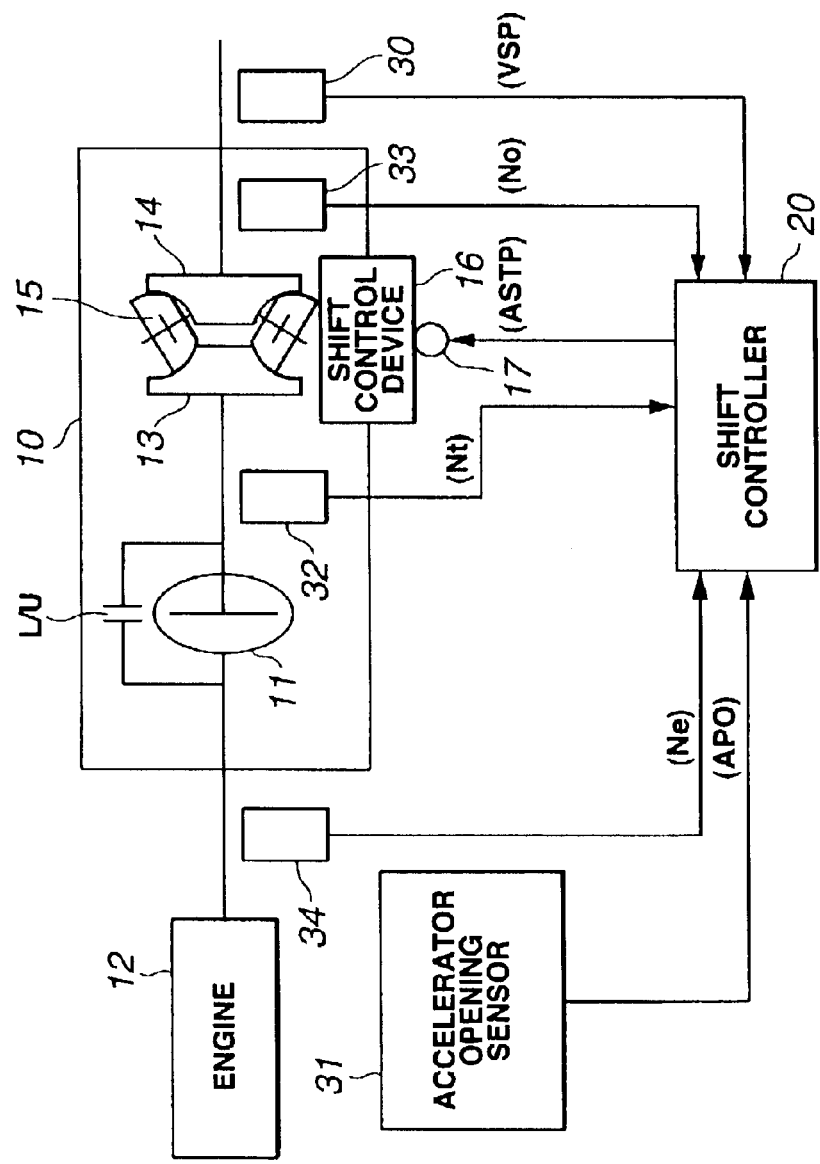
FIG. 1 is a schematic view showing a shift control system of a toroidal continuously variable transmission according to an embodiment of the present invention.

FIG. 1 shows a shift control system of a toroidal continuously variable transmission (toroidal CVT) 10 according to the embodiment of this invention. The toroidal CVT 10 comprises an input disc(s) 13 which receives a rotation force generated by an internal combustion engine 12 through a torque converter 11 having a lockup clutch L/U, an output disc(s) 14 coaxial with the input disc 13, and the power rollers 15 rotatably clamped by the input and output discs 13 and 14.

A power transmission between the input and output discs 13 and 14 through the power rollers 15 are achieved by a shearing stress of an oil film formed between the power rollers 15 and the input and output discs 13 and 14.

A shift operation of the toroidal CVT 10 is executed by the operation of power-roller supporting members (not shown and so-called a trunnion) and a piston-type servo mechanism (not shown). More specifically, the power rollers 15 are moved from a neutral position, which is an intersection between a rotation axis of the power roller 15 and a rotation axis of the input and output discs 13 and 14, along a direction of an inclination axis on which the power roller 15 is inclined and which is perpendicular to the rotation axis of the power rollers 15. This direction of the inclination axis is perpendicular to a plane of a paper on which FIG. 1 is shown. With this arrangement, the power rollers 15 are capable of being inclined on the inclination axis together with the power-roller supporting members by a component of the rotational force. Accordingly, the gear ratio of the toroidal CVT 10 is continuously varied according to this continuous variation of an arc radius of a contact locus of the power roller 15 relative to the input and output discs 13 and 14.

The movement of the power rollers 15 along the inclination axis is achieved by operating a shift actuator (stepper motor) 17 of a shift control system 16 in response to a stepper motor command ATSP corresponding to a desired gear ratio. By executing a feedback of a proceeding state of a shift operation through a mechanical feedback system (not shown), the power roller 5 is returned to the neutral position when an actual gear ratio reaches the desired gear ratio, and the desired gear ratio is maintained.

The power rollers 15 receive the force directed toward a thrown-out direction along which the power roller 15 is thrown out of the input and output discs 13 and 14 since the power roller 15 is rotatably clamped by the input and output discs 13 and 14 with a thrust force according to the transmission input torque, and therefore the power roller supporting members are slightly deformed by this pressing force. Such a deformation of the power roller supporting members mainly acts as a disturbance of a mechanical feedback system. Due to this input of the disturbance to the mechanical feedback system causes a disaccord between the actual gear ratio and the desired gear ratio of the toroidal CVT 10 after a shifting. This difference between the actual gear ratio and the desired gear ratio is a torque shift.

In order to determine the motor command value ASTP, the shift controller 20 receives various signals, such as, a signal sent from a vehicle speed sensor 30 for detecting a vehicle speed VSP, a signal sent from an accelerator opening sensor 31 for detecting a depression quantity of an accelerator pedal, a signal sent form an input rotation speed sensor 32 for detecting a turbine speed Nt (transmission input rotation speed), a signal sent from an engine speed sensor 34 for detecting an engine rotation speed Ne.

Figure 2:
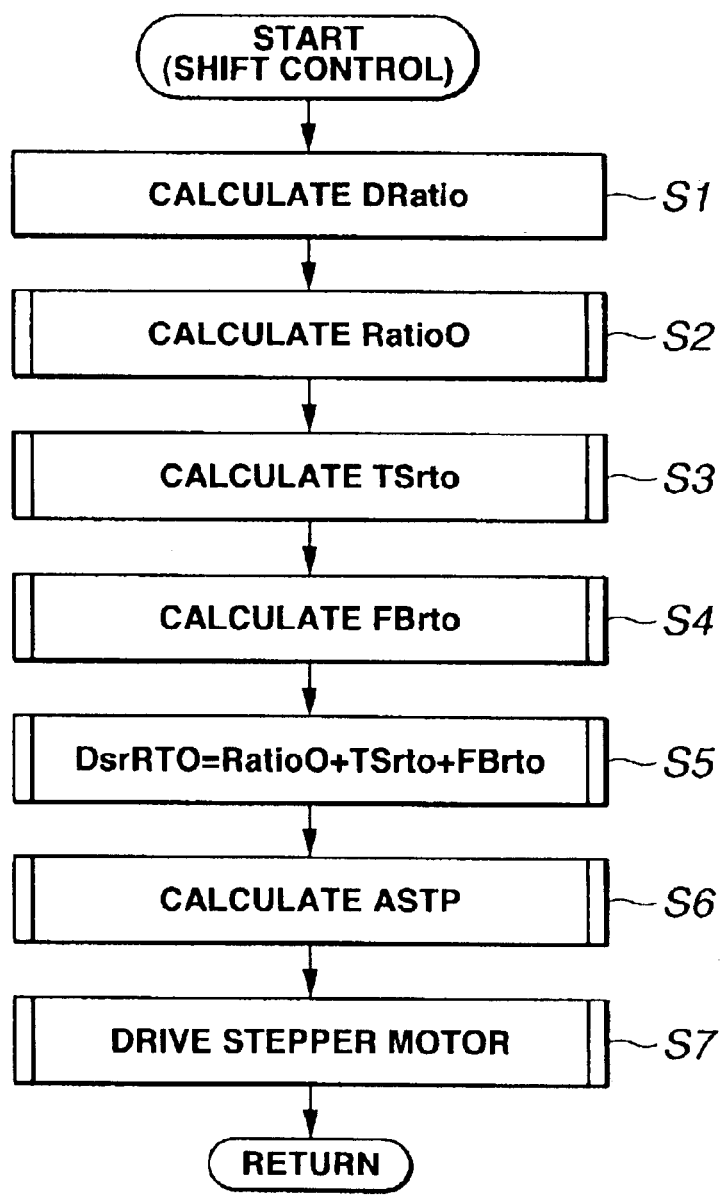
FIG. 2 is a flowchart showing a main routine of a shift control executed by a shift controller in FIG. 1.

The shift controller 20 determines the stepper motor command value ASTP by executing a control program of FIG. 2 on the basis of the input information. Further the shift controller 20 outputs the stepper motor command value ASTP to the stepper motor 17 of the shift control device 16 so that the toroidal CVT 10 executes a predetermined shift operation.

The program of FIG. 2 is a timer interruption routine and is executed at 10 msec intervals.

Figure 5:
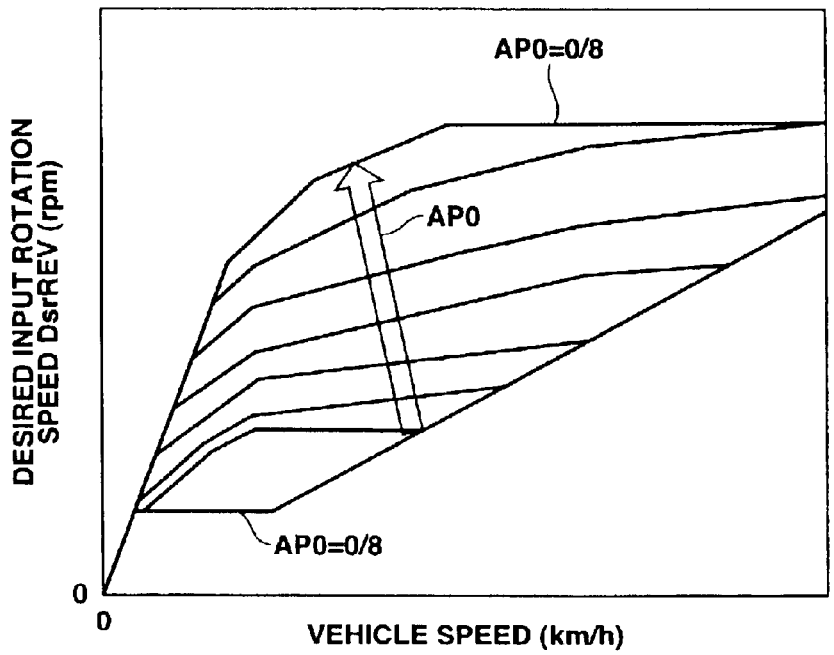
FIG. 5 is a graph showing a shift pattern of the toroidal continuously variable transmission.

At step S1 the shift controller 20 calculates a desired input rotation speed DsrREV from the accelerator depression quantity APO and a vehicle speed VSP using a shift map shown in FIG. 5. Further, the controller 20 calculates an attainable gear ratio DRatio by diving the desired input rotation speed DsrREV by the transmission output speed No.

Figure 3:
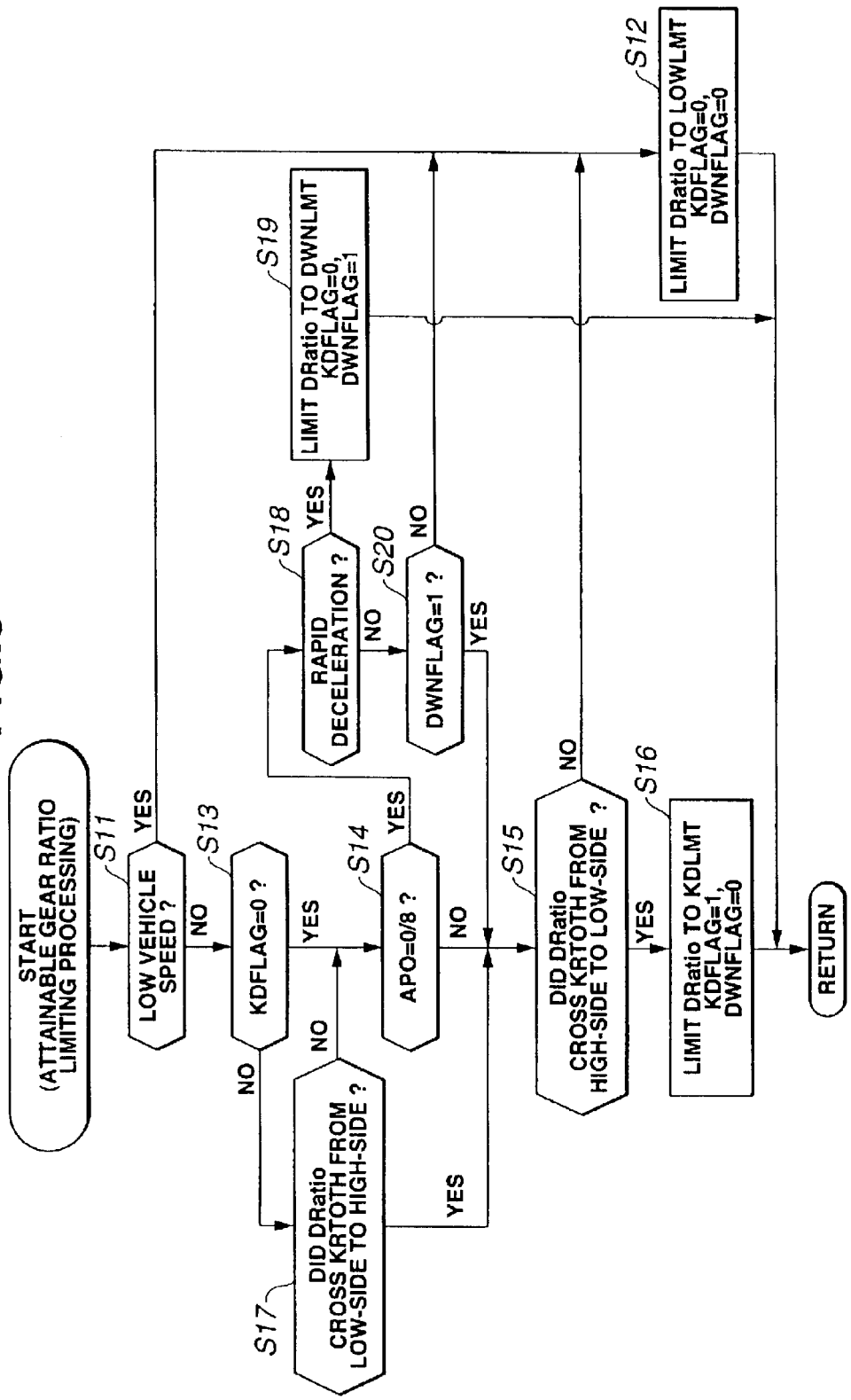
FIG. 3 is a flowchart showing a subroutine of an attainable gear limiting processing employed in a calculation of the attainable gear ratio in the main routine.

In this embodiment, during when the attainable gear ratio DRatio is obtained, by executing the program shown in FIG. 3, a shifting is forbidden between a low-speed side gear ratio region ($\alpha 1$–$\alpha 2$) including a lowest-speed side gear ratio and a high-side gear ratio region $\alpha 2$, as shown by the following manner. Hereinafter, the gear ratio in the high-speed side is called a high-speed side gear ratio which corresponds to a small gear ratio, and the gear ratio in the low-speed side is called a low-speed side gear ratio which corresponds to a large gear ratio.

Figure 6:
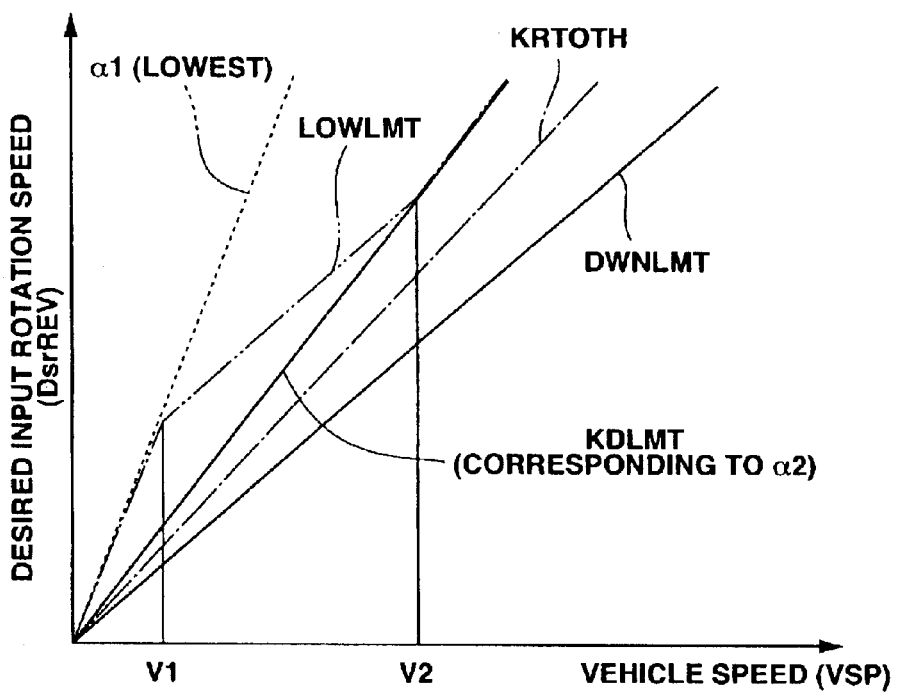
FIG. 6 is a graph showing a limited gear ratio employed when the attainable gear ratio is limited in FIG. 3.
Figure 11:
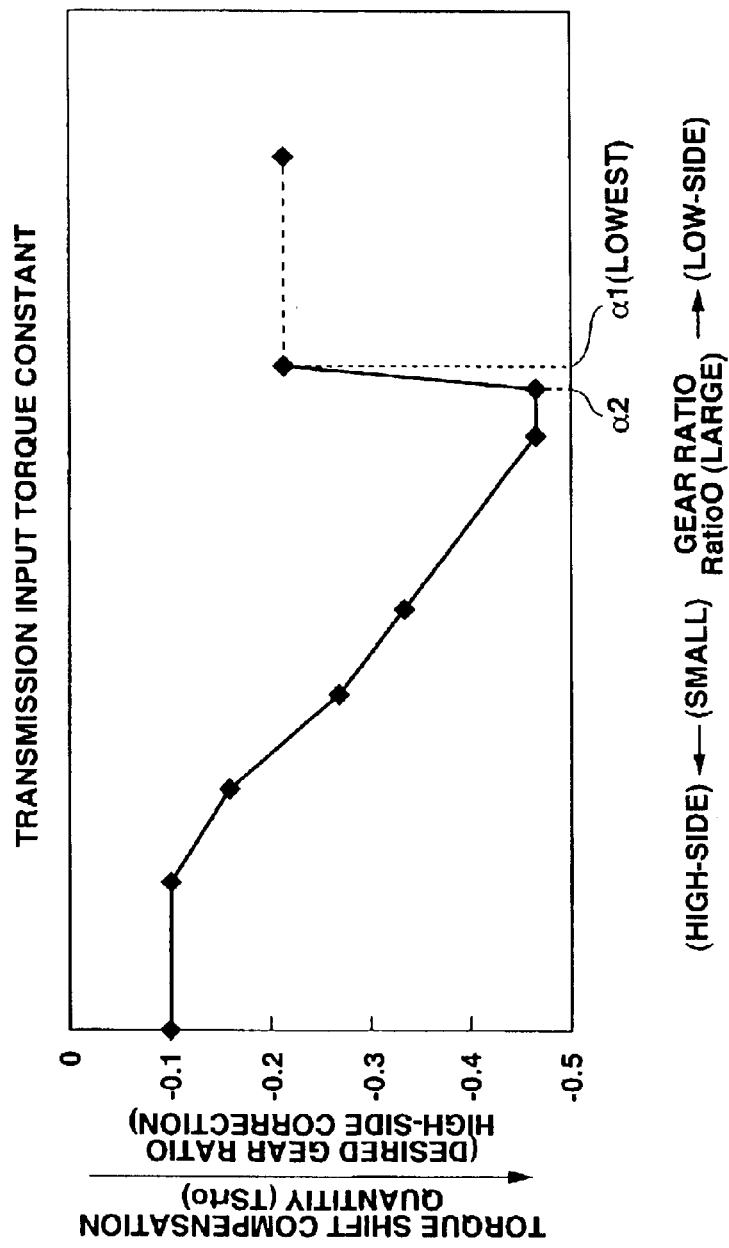
FIG. 11 is a graph showing a relationship between the gear ratio and the torque shift compensation quantity under a transmission input torque constant condition employed in the shift control system according to the present invention.

That is, as shown in FIG. 6, there are set a kick down limit gear ratio KDLMT corresponding to a high-speed side gear ratio $\alpha 2$, a kick down determination gear ratio KRTOTH slightly higher in speed than the kick down limit gear ratio KDLMT and a down limit gear ratio DWNLMT slightly higher in speed than the kick down limit gear KDLMT on the two-dimensional coordinate system constructed by a desired input rotation speed DsrREV and a vehicle speed VSP (corresponding to the transmission output speed No). A low-speed side gear ratio region including the lowest-speed gear ratio $\alpha 1$ is defined by the lowest side gear ratio $\alpha 1$ and the kick down limit gear ratio KDLMT corresponding to the gear ratio $\alpha 2$, and the torque shift compensation quantity TSrto is set at a small value within the low-speed side gear ratio region as shown in FIG. 11.

Further, a low limit gear ratio LOWLMT is set at the lowest-speed gear ratio $\alpha 1$ when the vehicle speed VSP is in a low speed region smaller than a value V1. The low limit gear ratio LOWLMT is set at the kick down limit gear ratio KDLMT corresponding to the gear ratio $\alpha 2$ when the vehicle speed VSP is in a high speed region higher than a value V2. The low limit gear ratio LOWLMT is set to be varied on a line smoothly connecting the line of the lowest gear ratio $\alpha 1$ and the line of the kick down limit gear ratio KDLMT when the vehicle speed VSP is in a transition region between V1 and V2.

It is preferable that the preset value V1 is set at a vehicle speed at which the acceleration during the vehicle staring period takes a peak value. By this setting, even when the gear ratio varies through the transition region between V1 and V2 to the kick down limit KDLMT, the vehicle smoothly starts to run without applying strange feeling to the driver.

On the basis of the respective gear ratios set as shown in FIG. 6, at step S11 in the program of FIG. 3, the controller 20 determines whether or not the vehicle speed VSP is smaller than a predetermined vehicle speed, in order to determine whether or not the vehicle is in a low speed state including a stop state. When the determination at step S11 is affirmative (low speed state), the routine proceeds to step S12 wherein the attainable gear ratio DRatio is limited to the low limit gear ratio LOWLMT, and both of a kick down flag KDFLAG indicative of a depression of the accelerator pedal and a down flag DWNFLAG indicative of a rapid deceleration are reset (KDFLAG=0 and DWNFLAG=0).

Figure 7:
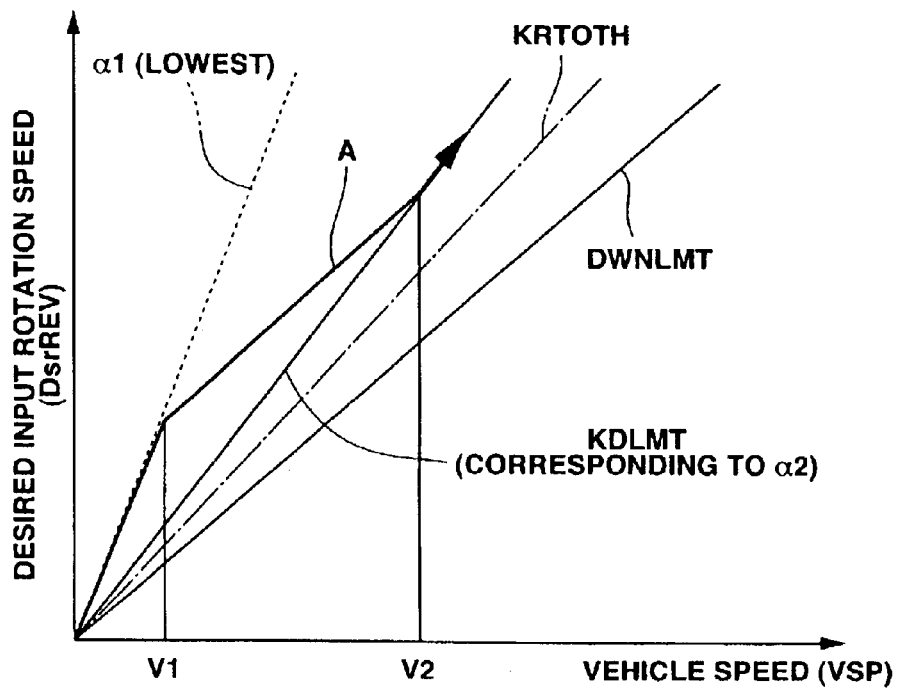
FIG. 7 is a graph showing a gear ratio changing state at a moment of the vehicle starting based on the limited gear ratio.

By limiting the attainable gear ratio DRatio to the low limit gear ratio LOWLMT when the vehicle travels at the low speed state, it becomes possible to vary the attainable gear ratio DRatio during the vehicle starting period, as shown by an arrow A of FIG. 7. This enables the toroidal CVT 10 to use the lowest-speed gear ratio $\alpha 1$ at an initial stage of starting the vehicle. Therefore, it becomes possible to certainly stop the vehicle under a lowest-speed gear ratio selected state.

When the determination at step S11 is negative, that is, when the vehicle is in a running state except for the low speed state including the vehicle stop state, the routine proceeds to step S13 wherein the controller 20 determines whether or not the kick down flag KDFLAG is set at 0. More specifically, the controller 20 checks at step S13 whether the kick down determination has been executed yet. When the determination at step S13 is affirmative (KDFLAG=0), that is, when the kick down determination has not been determined, the routine proceeds to step S14 through step S16 to execute the kick down determination as follows.

That is, at step S14, the negative determination is made that the vehicle is not in a foot-release state where the accelerator pedal depression quantity is 0/8. Then at step S15 the controller 20 determines whether or not the attainable gear ratio DRatio has crossed the line of the kick down determination gear ratio KRTOTH shown in FIG. 6 from the downward (high-speed side) toward the upward (low-speed side) in order to determine whether the kick down has been executed. When the determination at step S15 is affirmative, the routine proceeds to step S16 wherein the attainable gear ratio DRatio is limited to the kick down limit gear ratio KDLMT. This limitation at step S16 prohibits to select the low-speed side gear ratio region ranging from α1 to α2, and simultaneously sets the kick down flag KDFLAG at 1 so as to indicate the depressing operation of the accelerator pedal (the kick down operation), and resets the down flag DWN-FLAG indicative of the rapid deceleration (KDFLAG=1 and DWNFLAG=0).

Figure 8:
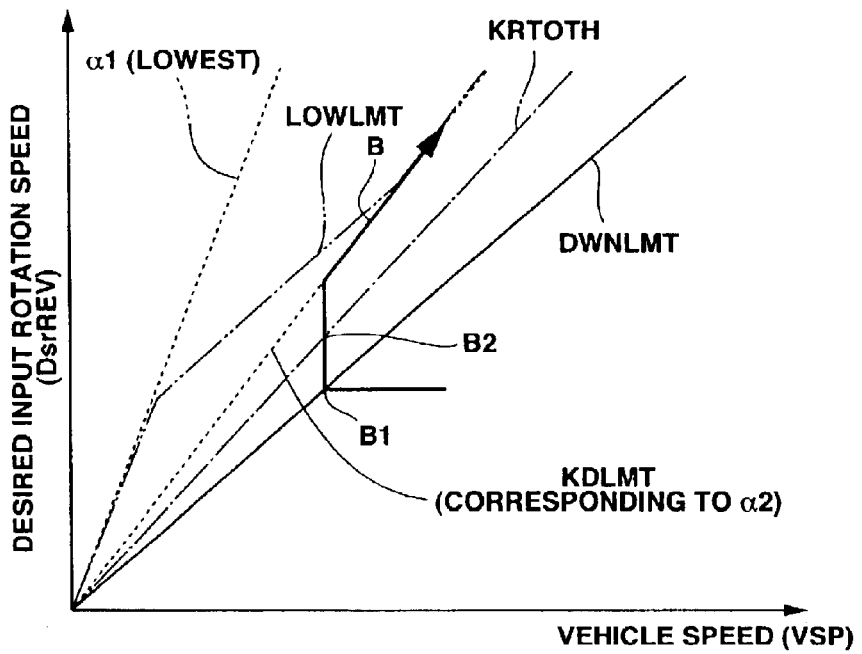
FIG. 8 is a graph showing a gear ratio changing state at a moment of a kick-down re-acceleration based on the limited gear ratio.

With reference to FIG. 8, there will be discussed the manner of operation of the shift control system according to the present invention in case that the attainable gear ratio DRatio is limited to the kick down limit gear ratio KDLMT at step S16 subsequent to the kick down determination at step S15.

As shown by an arrow B in FIG. 8, when the attainable gear ratio DRatio upwardly crosses the line of the kick down determination gear ratio KRTOTH at a point B2 due to the depression of the accelerator pedal after the vehicle is decelerated toward a point B1, the affirmative determination is made at step S15 so that the routine in FIG. 3 proceeds to step S16. Accordingly, the attainable gear ratio DRatio is prohibited to take a gear ratio lower in speed than the kick down limit gear ratio KDLMT. This prevents the toroidal CVT 10 from selecting the gear ratio ranging from α1 to α2 close to the lowest-speed gear ratio α1 even during the kick down operation where the accelerator depression quantity APO is set at a large value.

When it is determined at step S13 that the kick down flag KDFLAG has been already set at 1, that is, when the kick down has been already executed, a cancellation of the kick down determination is executed by the following manner.

At step S17 the controller 20 determines whether or not the kick down is terminated by determining whether the attainable gear ratio DRatio has crossed the line of the kick down determination gear ratio KRTOTH from the upward (low-speed side) to the downward (high-speed side).

When it is determined at step S17 that the kick down has not been terminated (negative determination), the routine proceeds to step S14. When it is determined at step S17 that the kick down has been terminated (affirmative determination), the routine proceeds to step S15 wherein the negative determination is made. Accordingly, the routine proceeds to step S12 wherein the attainable gear ratio DRatio is limited to the low limit gear ratio LOWLMT, and both of the kick down flag KDFLAG indicative of the depression of the accelerator pedal and the down flag DWNFLAG indicative of the rapid deceleration are reset (KDFLAG=0 and DWNFLAG=0).

When the determination at step S14 is affirmative, that is, when it is determined at step S14 that the vehicle is in the foot-released state where APO=0/8, the routine proceeds to step S18 wherein the controller 20 determines whether or not the vehicle is in a rapid deceleration state, from the degree of change of the vehicle speed VSP or the like. For example, when the controller 20 determines that a deceleration G received from an acceleration sensor (not shown) for detecting an acceleration of the vehicle is greater in magnitude than a predetermined value, or when the controller 20 determines that a change of a wheel speed, which speed is detected by a wheel speed sensor (not shown) for detecting a rotation speed of a wheel of the vehicle, is greater than the predetermined value, the controller 20 determines that the vehicle is in the rapid deceleration state. In other words, the rapid deceleration state is defined as a state wherein the deceleration of the vehicle is greater than the predetermined value.

When the determination at step S18 is affirmative, that is, when the vehicle is in the rapid deceleration state, the routine proceeds to step S19 wherein the controller 20 limits the attainable gear ratio DRatio to the down limit gear ratio DWNLMT, sets the kick down flag KDFLA at zero (KDFLAG=0) and sets the down flag DWNFLAG at 1 (DWNFLAG=1).

Figure 9:
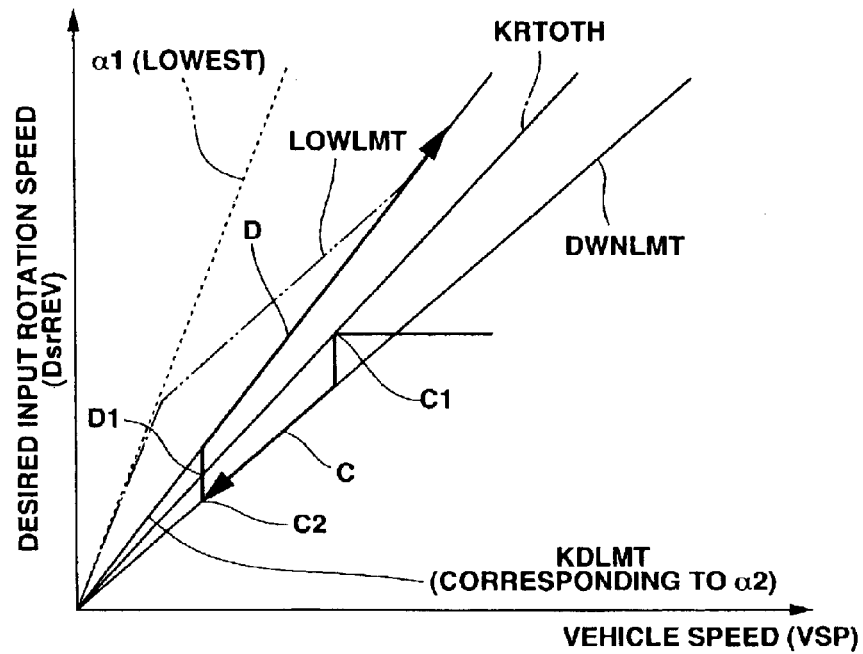
FIG. 9 is a graph showing a gear ratio changing state during a period from a rapid deceleration based the limited gear ratio to the kick-down acceleration subsequent to the rapid deceleration.

Explaining as to the case that the above-discussed rapid deceleration is executed when the vehicle is decelerated to the point C1 as shown by an arrow C in FIG. 9, by this control of limiting the attainable gear ratio DRatio to the down limit gear ratio DWNLMT during the rapid deceleration, the rapid deceleration is executed while the gear ratio is kept at the down limit gear ratio DWNLMT, without taking a high-side gear ratio over the down limit gear ratio DWNLMT.

When it is determined at step S18 that the deceleration of the vehicle is not the rapid deceleration, the routine proceeds to step S20 wherein the controller 20 checks whether or not the previous accelerator pedal release caused a rapid deceleration by checking whether the down flag DWNFLAG is set at 1. When the determination at step S20 is negative, the routine proceeds to step S12 wherein the controller 20 limits the attainable gear ratio DRatio to the low limit gear ratio LOWLMT and resets both of the kick down flag KDFLAG and the down flag DWNFLAG.

When it is determined at step S20 that the previous deceleration was the rapid deceleration from DWNFLAG=1, the routine proceeds to step S15.

Explaining as to a case that there is executed the kick down due to the depression of the accelerator pedal at a point C2 as shown by an arrow D following the arrow C in FIG. 9. The controller 20 determines at step S15 that the kick down was executed from the fact that the attainable gear ratio DRatio crossed the line of the kick down gear ratio KRTOTH at a point D1 from the downward (high-speed side gear ratio) to the upward (low-speed side gear ratio).

By this kick down determination, the attainable gear ratio DRatio is limited to the kick down limit gear ratio KDLIMT so as to prohibit the attainable gear ratio DRatio to take the gear ratio lower in speed than the kick down limit gear ratio KDLMT and to prevent the toroidal CVT 10 from selecting the gear ratio ranging form α1 to α2 including the lowest-speed gear ratio α1 even when the kick down, which increases the depression quantity APO to a point higher than a point C2, is executed.

After the attainable gear ratio DRatio is obtained at step S1 in FIG. 1, at step S2 the controller 20 calculates the desired gear ratio Ratio0 which is a transient value linked with the time elapse and for executing a predetermined shift response of a shifting from the actual gear ratio Ratio to the attainable gear ratio DRatio, according to the operating condition.

Figure 4:
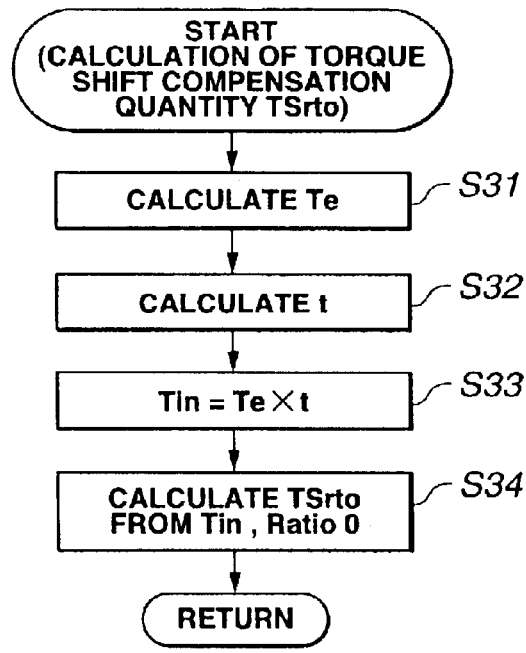
FIG. 4 is a flowchart showing a subroutine for calculating a torque shift compensation quantity in the main routine.

At step S3 the controller 20 calculates the torque compensation quantity TSrto by executing the processing shown in FIG. 4.

At step S31 in FIG. 4 the controller 20 estimates an engine torque Te from the engine speed Ne and the accelerator depression quantity APO on the basis of a stored map (not shown).

At step S32 the controller 20 calculates the torque ratio t of the torque converter 11 from the engine speed Ne and the input rotation speed Nt on the basis of a map (or table).

At step S33 the controller 20 calculates the transmission input torque Tin by multiplying the engine torque Te obtained at step S21 and the torque ratio t obtained at step S32.

At step S34 the controller 20 selects a map indicative of a relationship between a torque shift compensation quantity indicative map shown in FIG. 11, and retrieves the torque shift compensation quantity TSrto from the previous value of the desired gear ratio Ratio0 on the basis of the selected map.

There will be supplementally discussed a characteristic of the torque shift compensation quantity TSrto shown in FIG. 11.

By the generation of the torque shift toward the low-speed side gear ratio, the actual gear ratio shifts toward the lower side gear ratio as compared with the actual gear ratio. Accordingly, the torque shift increases as the transmission input torque becomes larger and/or as the gear ratio is varied toward a low-speed side value (increases toward a largest gear ratio). Therefore, the torque shift compensation quantity TSrto takes a negative value to correct the gear ratio toward the high-speed side gear ratio, and an absolute value of the torque shift compensation quantity TSrto is increased as the transmission input torque Tin increases and/or as the gear ratio Ratio0 approaches the low-speed side gear ratio. FIG. 11 shows a relationship between the torque shift compensation quantity TSrto and the gear ratio under a condition that the torque input torque Tin is constant.

Figure 10:
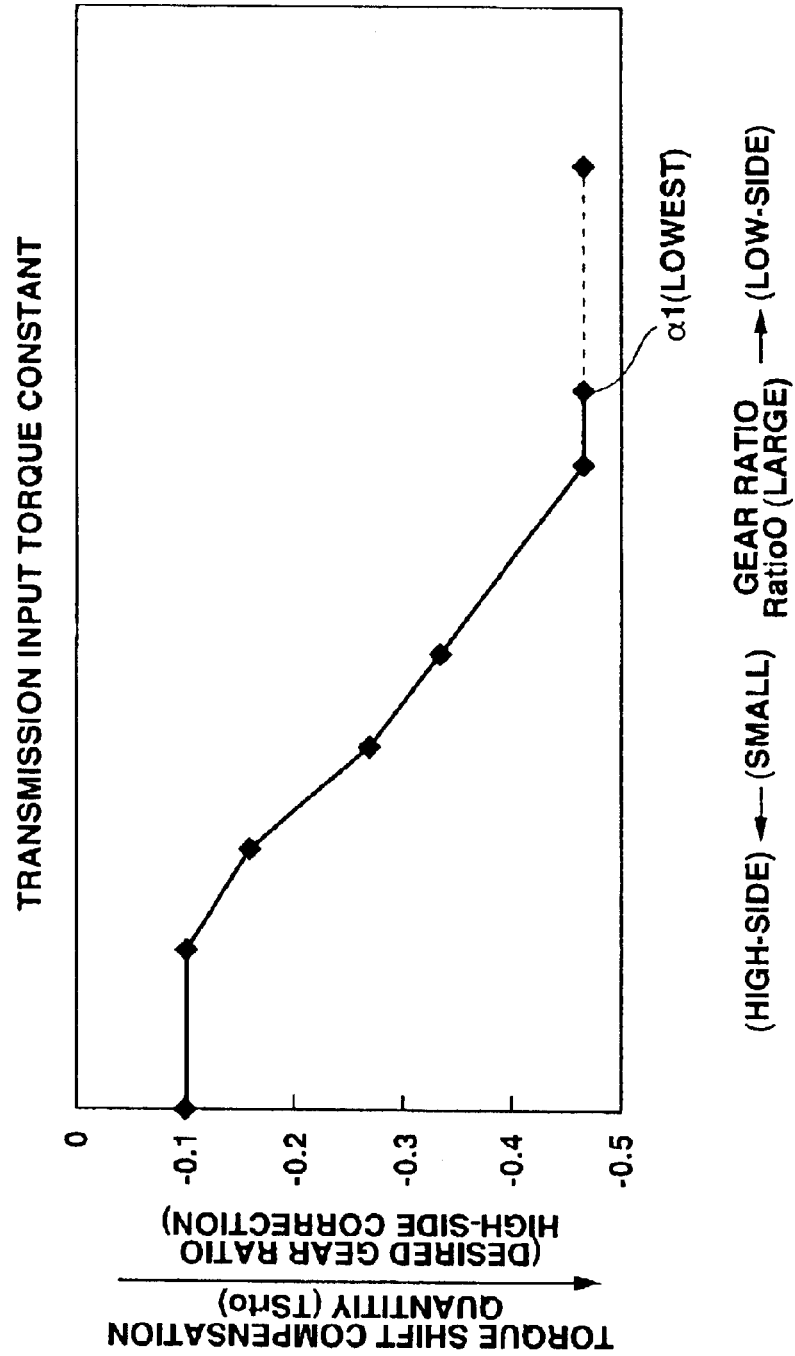
FIG. 10 is a graph showing a relationship between the gear ratio and the torque shift compensation quantity under a transmission input torque constant condition in a conventional system.

As discussed above, if the torque shift compensation quantity is set at a large value in magnitude as shown in FIG. 10 when the gear ratio is in a low-speed side gear ratio region close to the lowest-speed gear ratio, in addition to increasing the feedback gain of the mechanical feedback system in order to prevent the power roller supporting member from colliding with the tilt stopper, a shifting is terminated without reaching the lowest-speed gear ratio α1. That is, under this setting, a shifting to the lowest side gear ratio α1 is disabled. Accordingly, in order to avoid such a problem, the torque sift compensation quantity TSrto is decreased when the gear ratio is in the low-speed side gear ratio region ranging from α1 to α2 which region is close to the lowest-speed gear ratio α1 in the arrangement according to the present invention as shown in FIG. 11.

After the torque shift compensation quantity TSrto is obtained at step S3 in FIG. 2, at step S4 the controller 20 calculates a feedback compensation quantity FBrto by the PID control (P: proportional control, I: integral control, D: differential control) based on the feedback gain according to a deviation between the desired gear ratio Ratio0 and the actual gear ratio Ratio and the operating condition of the toroidal CVT 10. As discussed above, the desired gear ratio Ratio0 is obtained at step S2, and the actual gear ratio Ratio is obtained by diving the input rotation speed Nt by the output rotation speed No of the toroidal CVT 10.

At step S5 the controller 20 calculates a command gear ratio DsrRTO by adding the desired gear ratio Ratio0 obtained at step S2 and the torque shift compensation quantity TSrto obtained at step S3 and the feedback compensation quantity FBrto obtained at step S4 (DsrRTO= Ratio0+TSrto+Fgrto).

At step S6 the controller 20 calculates a stepper motor command value ASTP for realizing the command transmission ratio DsrRTO.

At step S7 the controller 20 drives the stepper motor 17 according to the stepper motor command value ASTP.

With the thus arranged embodiment according to the present invention, the torque shift compensation quantity is decreased in magnitude when the gear ratio is in a low-speed side gear ratio region ranging from the lowest-speed gear ratio α1 to the boundary gear ratio α2.

That is, under a condition that the feedback gain of the mechanical feedback system has been set to take a large value when the gear ratio takes a value close to the lowest-speed gear ratio in order to prevent the power-roller supporting member from colliding with the tilt stopper, if the torque shift compensation quantity in the gear ratio region close to the lowest-speed gear ratio is set at the large value, as shown in FIG. 10 in addition to the large value setting of the feedback gain of the mechanical feedback system, there will cause a problem that the shifting to the lowest-speed gear ratio is further suppressed by the large value setting of the torque shift compensation quantity in addition to the large setting of the feedback gain of the mechanical feedback system in the low-speed side gear ratio region closed to the lowest-speed gear ratio.

In contrast to this, by decreasing the torque shift compensation quantity in the low-speed side gear ratio region ranging from the lowest-speed gear ratio α1 to the gear ratio α2 as shown in FIG. 11, in accordance with the present invention, it becomes possible to prevent the above-problem that the shifting to the lowest-speed gear ratio α1 is disabled. That is, the shift control system according to the present invention certainly achieves the shifting to the lowest-speed gear ratio α1 and prevents the vehicle starting performance from being affected by the problem that the shifting to the lowest-speed gear ratio α1 is disabled.

Further, with the thus arranged embodiment according to the present invention, as to the toroidal CVT which is arranged to prevent the shifting to the lowest-speed gear ratio from being disabled by decreasing the torque shift compensation quantity TSrto when the gear ratio is in the low-speed side gear ratio region ranging from α1 to α2 close to the lowest-speed gear ratio and even when the low-speed side gear ratio is selected, the shifting at a boundary region between the low-speed side gear ratio region ranging from α1 to α2 and the high-speed side gear ratio region except for the low-speed gear ratio region is limited as follows.

That is, as discussed regarding FIG. 8, when the gear ratio is in the high-speed side gear ratio region, it is prohibited to select a gear ratio in the low-speed side gear ratio region, which is lower in speed than the kick down limit gear ratio KDLMT, as shown by an arrow B even if the toroidal CVT 10 is in a condition where the gear ratio should be in the low-speed side gear ratio region ranging from α1 to α2 due to the execution of the kick down by the depression of the accelerator pedal. This is achieved by executing the processing of step S15 and 16 in FIG. 3. By this arrangement, it is prohibited that the gear ratio is set in the low-speed side gear ratio region ranging α1 to α2 where the torque shift compensation quantity TSrto is set small.

Therefore, when the toroidal CVT 10 is operating in the high-speed side gear ratio region, the shifting to the low-speed side gear ratio region is prohibited even if the vehicle is operating under the high load condition. This arrangement solves problems that a shock is generated or a strange feeling is applied to a driver by a difference between the torque shift compensation quantities in the low-speed side gear ratio region and the high-speed side gear ratio region except for the lowest side gear ration region if such a shifting is allowed, and that the power roller supporting member collides with a tilt stopper due to the shortage of the torque shift compensation quantity when the gear ratio is in the low-speed side gear ratio region closed to the lowest gear ratio α1 if such a shifting is allowed.

Further, with the thus arranged embodiment according to the present invention, there is prohibited the shifting to the low-speed side gear ratio region close to the lowest-speed gear ratio, which shifting is executed due to the high load operation of the vehicle when the gear ratio is in the high-speed side gear ratio region, and there is cancelled the down shift limitation when it is determined that the vehicle is in the low speed state including the vehicle stop state. This arrangement is achieved by executing the processing of steps S11 and S12 in FIG. 3. By this arrangement, it becomes possible to use the low-speed side gear ratio region including the lowest-speed gear ratio when it is necessary to use such the low-speed side gear ratio region, such as in a vehicle starting period. This cancellation of the shift down limitation preferably maintains the drivability of the vehicle even if the prohibition of the shifting to the low-speed gear ratio region.

Furthermore, the shift control system according to the present invention is arranged such that the lowest-speed gear ratio α1 is selected when the vehicle speed is smaller than the first predetermined vehicle speed V1, and that the low limit gear ratio LOWLMT, which is a line smoothly connecting the lowest-speed gear ratio α1 and the kick down limit gear ratio KDLMT corresponding to α2. The kick down limit gear ratio KDLMT is the boundary gear ratio between the low-speed side gear ratio region and the high-speed side gear ratio region.

Accordingly, it becomes possible to smoothly vary the gear ratio between the lowest-speed gear ratio α1 and the boundary gear ratio KDLMT=α2 according to the change of the vehicle speed. This improves the shift feeling during the transition state.

Additionally, the shift control system according to the present invention is arranged such that the down shift due to the rapid deceleration is limited to the down limit gear ratio DWNLMT under a condition the rapid deceleration is executed in the high-speed gear ratio region until it is detected that the rapid deceleration is terminated or that the vehicle is reaccelerated, as shown by the arrow C in FIG. 9. This arrangement is achieved by the processing of steps S18 and S19 in FIG. 3. With this arrangement according to the present invention, the following advantage is derived.

That is, the shift control of the toroidal CVT is generally executed based on the command gear ratio DsrRTO obtained by adding the desired gear ratio Ratio0, the torque shift compensation quantity TSrto and the feedback compensation quantity FBrto according to the gear ratio deviation between the desired gear ratio Ratio0 and the actual gear ratio Ratio. Accordingly, if the shift down due to the rapid deceleration is unlimitedly allowed, the actual gear ratio cannot follow up the down shift command when the rapid deceleration is executed, and therefore the feedback compensation quantity is accumulated so as to move the gear ratio toward the lower speed side gear ratio. If the vehicle is accelerated under this accumulated state of the feedback compensation quantity, the shifting is delayed due to making time for discharging the accumulated feedback compensation quantity and due to the torque shift compensation quantity TSrto set at a small value. This delay may cause a collision between the tilt stopper and the power roller supporting member influenced by the toque shift.

In contrast, since the shift control system of the toroidal CVT 10 according to the present invention is arranged such that the down shift due to the rapid deceleration is limited to the down limit gear ratio DWNLMT in the high-speed side gear ratio, the increase of the gear ratio deviation between the desired gear ratio Ratio0 and the actual gear ratio Ratio is prevented even if the torque shift compensation quantity is decreased in the low-speed side gear ratio region closed to the lowest-speed gear ratio, and thereby suppressing the accumulation of the feedback compensation quantity. Accordingly, it becomes possible to certainly avoid the delay of shifting and the generation of the collision of the low-speed side tilt stopper even when the vehicle is reaccelerated after the rapid deceleration.

This application is based on Japanese Patent Application No. 2001-399341 filed on Dec. 28, 2001 in Japan. The entire contents of this Japanese Patent Application are incorporated herein by reference.

Although the invention has been described above by reference to a certain embodiment of the invention, it is not limited to the embodiment described above. Modifications and variations of the embodiment described above will occur to those skilled in the art, in light of the above teaching.

The scope of the invention is defined with reference to the following claims.

What is claimed is:

1. A shift control system for a toroidal continuously variable transmission (toroidal CVT) of a vehicle, comprising:
   a controller configured,
   to calculate a command gear ratio of the toroidal CVT by adding a desired gear ratio and a torque shift compensation for compensating a difference between the desired gear ratio and an actual gear ratio which difference is generated by a shifting operation of the toroidal CVT,
   to set the torque shift compensation quantity to increase as the actual gear ratio approaches a low-speed side gear ratio region including a lowest-speed gear ratio and to decrease when the actual gear ratio is the low-speed side gear ratio region.

2. The shift control system as claimed in claim 1, wherein the controller is further configured to prohibit to change the actual gear ratio from a gear ratio in a high-speed side gear ratio region to a gear ratio in the low-speed side gear ratio region after the actual gear ratio takes a gear ratio in the high-speed side gear ratio region except for the low-speed side gear ratio region.

3. The shift control system as claimed in claim 2, wherein the controller is further configured to prohibit to select the gear ratio in the low-speed side gear ratio region after the actual gear ratio takes the gear ratio in the high-speed side gear ratio region, even when the vehicle operates in a high load condition.

4. The shift control system as claimed in claim 2, wherein the controller is further configured to allow to select the gear ratio in the low-speed side gear ratio region when a vehicle speed is smaller than a low vehicle speed and when the vehicle is started.

5. The shift control system as claimed in claim 4, wherein the controller is further configured to select the lowest speed gear ratio when a vehicle speed is smaller than a first vehicle speed, and to select a low-side limit gear ratio, which smoothly varies between the low-speed side gear ratio region and the high-speed side gear ratio region, when the vehicle speed is in a range between the first vehicle speed and a second vehicle speed higher than the first vehicle speed.

6. The shift control system as claimed in claim 1, wherein the controller is further configured to limit a down shift due to a rapid deceleration of the vehicle to a predetermined gear ratio when the actual gear ratio is in the high-speed side gear ratio region and when the rapid deceleration is detected.

7. The shift control system as claimed in claim 6, wherein the controller is further configured to limit a down shift due to a rapid deceleration of the vehicle to a predetermined gear ratio within the high-speed side gear ratio region until one of first and second conditions is detected, the first condition including a condition that the rapid deceleration is terminated, and second condition includes a condition that the vehicle is reaccelerated.

8. The shift control system as claimed in claim 6, wherein the controller is further configured to prohibit to select the gear ratio in the low-speed side gear ratio region after the vehicle is reaccelerated.

9. A shift control system of a toroidal continuously variable transmission (toroidal CVT) for a vehicle, comprising:

a transmission rotation speed detector that detects an input rotation speed and the output rotation speed of the toroidal CVT;

an accelerator opening detector that detects a depression degree of an accelerator pedal;

a vehicle speed detector that detects a vehicle speed;

a shift control device that operates the toroidal CVT according to a command gear ratio;

a controller connected to the transmission rotation speed detector, the accelerator opening detector, a vehicle speed detector and the shift control device, the controller being configured, to calculate an actual gear ratio of the toroidal CVT from the input and output rotation speeds of the toroidal CVT, to calculate a desired gear ratio based on a shift map from the depression degree of the accelerator pedal and the vehicle speed, to calculate the command gear ratio by adding the desired gear ratio and a torque shift compensation quantity for compensating a difference between the desired gear ratio and the actual gear ratio which difference is generated by a shifting operation of the toroidal CVT, to set the torque shift compensation quantity so as to increase as the actual gear ratio approaches a low-speed side gear ratio region including a lowest-speed gear ratio and so as to decrease when the actual gear ratio is the low-speed side gear ratio region, to prohibit to select a gear ratio in the low-speed side gear ratio region after the actual gear ratio takes a gear ratio in a high-speed side gear ratio region except for the low-speed region.

10. A shift control system for a toroidal continuously variable transmission (toroidal CVT) of a vehicle, comprising:

a command gear ratio calculating means for calculating a command gear ratio of the toroidal CVT by adding a desired gear ratio and a torque shift compensation for compensating a difference between the desired gear ratio and an actual gear ratio which difference is generated by a shifting operation of the toroidal CVT; and a torque shift compensation quantity setting means for setting the torque shift compensation quantity so as to increase as the actual gear ratio approaches a low-speed side gear ratio region including a lowest-speed gear ratio and so as to decrease when the actual gear ratio is the low-speed region.

11. The shift control system as claimed in claim 10, further comprising a prohibiting means for prohibiting to change the actual gear ratio from a gear ratio in the high-speed side gear ratio region to a gear ratio in the low-speed side gear ratio region after the actual gear ratio is in the high-speed side gear ratio region except for the low-speed side gear ratio region.

12. The shift control system as claimed in claim 11, further comprising an allowing means for allowing to select the gear ratio in the low-speed side gear ratio region when a vehicle speed is smaller than a low vehicle speed.

13. The shift control system as claimed in claim 12, further comprising a lowest-speed gear ratio selecting means for selecting the lowest speed gear ratio when a vehicle speed is smaller than a first vehicle speed, and a low-side limit gear ratio selecting means for selecting a low-side limit gear ratio, which smoothly varies between the low-speed side gear ratio region and the high-speed side gear ratio region, when the vehicle speed is in a range between the first vehicle speed and a second vehicle speed higher than the first vehicle speed.

14. The shift control system as claimed in claim 10, further comprising a down-shift limiting means for limiting a down shift due to a rapid deceleration of the vehicle to a predetermined gear ratio when the actual gear ratio is in the high-speed side gear ratio region and when the rapid deceleration is detected.

* * * * *